3,498,830
CELLULOSE COATED CHROMATOGRAPHIC SHEETS
Kenneth D. Slining, Rochester, N.Y., assignor to Eastman Kodak Company, Rochester, N.Y., a corporation of New Jersey
No Drawing. Filed Mar. 1, 1967, Ser. No. 619,569
Int. Cl. C08d *13/24;* C08j *1/40;* B01d *15/08*
U.S. Cl. 117—138.8          2 Claims

ABSTRACT OF THE DISCLOSURE

Level-off D.P. cellulose is subjected to grinding in a fluid energy mill, and the resulting cellulose powder is coated onto a support sheet to form a chromatographic sheet. The ground cellulose can be washed with a solvent such as methanol before coating.

BACKGROUND OF THE INVENTION

Field of the invention

The present invention relates to a novel chromatographic sheet for thin layer chromatography and electrophoresis, to a novel cellulose powder produced for such sheets, and to a novel method for making such sheets.

DESCRIPTION OF THE PRIOR ART

Thin-layer chromatography has been conducted with sheets of glass carrying a coating of a sorbent material such as silica gel, alumina, or cellulose which is adhered to the glass by means of suitable binders such as gypsum, collodion, gelatin, and starch or other polymers. Recently this type of chromatography has been improved by utilizing a support sheet of a flexible synthetic polymer such as polyethylene terephthalate instead of the glass, but securing the sorbent coating thereon in a generally similar manner. In addition to retaining the sorbent coating on the polymer sheet by a binder mixed with the sorbent, there has sometimes been used a sub-layer of a bonding material which is coated on the polymer sheet before applying the sorbent coating thereto.

Excellent analytical results have been obtained with chromatographic sheets as described above wherein the sorbent material is cellulose powder but, as in any developing art, certain disadvantages have been detected which should be overcome, if possible. For example, chromatographic sheets coated with a commercial non-crystalline cellulose powder give good resolution when conducting chromatographic analyses, but the powder contains a material which migrates through the coating along with the developing solvent and masks or interferes with separations near the solvent front. Another useful form of cellulose is a level-off D.P. cellulose in the form of small disintegrated aggregates of crystals. A method for preparing such a cellulose material is described in detail in U.S. Patent 2,978,446, which issued Apr. 4, 1961, to Orlando A. Battista, the disclosure of which is incorporated by reference herein. This type of level off D.P. cellulose has been used successfully but is subject to the disadvantage that poorer resolution is obtained than is desired when analyzing or separating some organic compounds such as amino acids.

SUMMARY OF THE INVENTION

I have found that a substantial improvement in chromatographic sheets is obtained by coating them with a layer of level-off D.P. cellulose which I have first subjected to a grinding operation in a fluid-energy jet mill such as a 0202 Jet-O-Mizer fluid energy mill sold by the Fluid Energy Processing and Equipment Company. Other mills that can be used are the Vortac Impact Mill, the Sturtevant Micronizer Mill, the Gem Mill, and the Majac Mill.

In such a mill the particles of level-off D.P. cellulose are impacted against one another and against the walls of the apparatus as they are whirled around by a stream of high velocity air. Suitable mills of this type are described in many U.S. patents such as: 2,735,626; 2,690,880; 3,005,594, the disclosures of which are incorporated by reference herein.

DESCRIPTION OF THE PREFERRED EMBODIMENTS

In carrying out this invention Avicel T.G. level-off D.P. cellulose powder sold by the American Viscose Division of the F.M.C. Corporation was ground in a Jet-O-Mizer Fluid Energy Mill operated at an air pressure of 40 p.s.i.g., a cellulose feed pressure of 20 p.s.i.g. and a cellulose feed rate of 5 lbs. per hour. The resulting powder had a particle size distribution between 7 and 50 microns with an average of about 18 microns, whereas the starting material had a distribution between 7 and 100 microns with an average of 38 microns.

A slurry was then made up of 10 pounds of the ground cellulose powder and 50 pounds of methanol, and allowed to settle 8 hours, after which the supernatent liquid was decanted off. This process was repeated twice using 30-pound washes of methanol. The methanol-wet powder was then coated without a binder directly onto a polyethylene terephthalate sheet which had been corona discharge treated, after which the coat was dried in an oven, all as described in detail in the commonly assigned copending application, Ser. No. 619,630, entitled, "Thin Layer Chromatography," of K. D. Slining and Albert Baitsholts, filed concurrently herewith. Water can be added to the methanol-wet powder before coating.

It was found that when conducting chromatographic analyses with the coated sheet, greatly improved resolution of the materials being analyzed was obtained compared to the results with the starting microcrystalline cellulose which had not been ground as above. Further, there was no difficulty with any impurities migrating with the developing solvent to mask or interfere with separations near the solvent front, as with commercial cellulose powder and, to a lesser degree, with level-off D.P. microcrystalline cellulose.

Methanol is advantageous for washing the cellulose powder because it is effective, inexpensive, and a usual component of the slurry for coating film. Other polar solvents can be used, especially those which are miscible with water. Non-polar solvents can be used when the wet cellulose is dried for future use in making coating slurries.

The operating conditions of the fluid energy mill can be varied over a substantial range, such as a grinding air pressure of 20–60 p.s.i.g. and feed rates of ½–10 pounds per hour.

When a fluorescent indicator is desired in the coating, such an indicator can be added to the wet disperson before application to the support sheet. An example of such an indicator is a lead-manganese activated calcium silicate sold as GE phosphor No. X–12882 by the General Electric Company.

During the course of my research, the wet grinding of level-off D.P. microcrystalline cellulose powder in a ball mill was also investigated, but it was found that resolution in chromatography was not improved even though the particle size was reduced.

The mechanism of the improved results obtained with my jet-milled cellulose powder is not fully understood. It does not seem to be a function of powder size because, as pointed out above, improved results were not obtained with ball milled cellulose powder. It has also been found that superfine level-off D.P. cellulose, which has a particle size distribution between 5 and 53 microns, does not provide resolution equal to that of my novel product. It may be that jet milling fractures the larger particles and produces a different type of surface on the fractured particles and produces a different type of surface on the fractured particles, making interstices available in the cellulose structure, which makes possible an improved holding of the stationary phase during chromatography, but this is purely speculation and has not been proved scientifically at this time.

The invention has been exemplified primarily as it relates to polyethylene terephthalate supports. However, it is to be understood that it includes within its scope other polymeric films such as polystyrene, polyolefins such as polyethylene and polypropylene (alone or coated on a paper or other backing), cellulose triacetate, polyamides, and cyclohexanedimethanol polyterephthalate.

Although the invention has been described in detail with reference to certain preferred embodiments thereof, it will be understood that variations and modifications can be effected without departing from the spirit and scope of the invention as described hereinabove.

I claim:

1. A thin-layer chromatographic element comprised of a thin flexible support sheet coated with a layer of level-off D.P. microcrystalline cellulose which has been subjected to fluid energy milling at a pressure of about 20 to about 60 p.s.i.g. and has a particle size distribution between about 7 and about 50 microns.

2. A chromatographic element as described in claim 1 wherein said support sheet is a flexible film of polyethylene terephthalate.

References Cited

UNITED STATES PATENTS

| | | | |
|---|---|---|---|
| 2,690,880 | 10/1954 | Chatelain | 241—39 |
| 2,735,626 | 2/1956 | Trost | 241—48 |
| 2,978,446 | 4/1961 | Battista | 260—212 |
| 3,179,587 | 4/1965 | Battista et al. | |
| 3,218,223 | 11/1965 | Battista | 117—166 |
| 3,375,929 | 4/1968 | Jeffreys et al. | |

FOREIGN PATENTS

| | | |
|---|---|---|
| 980,022 | 1/1965 | Great Britain. |
| 1,010,604 | 11/1965 | Great Britain. |

MURRAY KATZ, Primary Examiner

J. E. MILLER, Jr., Assistant Examiner

U.S. Cl. X.R.

117—47, 166, 144; 210—31, 198